United States Patent [19]

Smith

[11] Patent Number: 5,499,187

[45] Date of Patent: Mar. 12, 1996

[54] VOLTAGE SENSING, AUTOSELECTING AIRCRAFT POWER SUPPLY INTERFACE

[75] Inventor: Gary B. Smith, Crownsville, Md.

[73] Assignee: Arinc Research Corporation, Annapolis, Md.

[21] Appl. No.: 415,502

[22] Filed: Apr. 3, 1995

[51] Int. Cl.⁶ .......................... H02M 1/10; H01H 35/00
[52] U.S. Cl. .......................................... 363/142; 307/130
[58] Field of Search .................................. 363/142, 143, 363/63; 307/22, 26, 28, 72, 75, 80, 81, 128, 130

[56] References Cited

U.S. PATENT DOCUMENTS

| | | | |
|---|---|---|---|
| D. 297,928 | 10/1988 | Harpley et al. | D13/4 |
| D. 328,057 | 7/1992 | Prager et al. | D13/110 |
| 3,772,583 | 11/1973 | Sahara et al. | 321/15 |
| 3,852,655 | 12/1974 | Justice | 321/8 |
| 3,900,787 | 8/1975 | Köster | 321/8 R |
| 4,415,959 | 11/1983 | Vinciarelli | 363/21 |
| 4,433,368 | 2/1984 | Choi | 363/45 |
| 4,590,546 | 5/1986 | Maile | 363/37 |
| 4,648,020 | 3/1987 | Vinciarelli | 363/71 |
| 4,665,323 | 5/1987 | Russell et al. | 363/142 |
| 4,675,797 | 6/1987 | Vinciarelli | 363/21 |
| 4,686,616 | 8/1987 | Williamson | 363/21 |
| 4,780,805 | 10/1988 | Chewuk et al. | 363/142 |
| 4,837,672 | 6/1989 | Donze | 363/143 |
| 4,843,301 | 6/1989 | Belanger | 323/299 |
| 4,864,488 | 9/1989 | Bulmahn et al. | 363/143 |
| 4,890,217 | 12/1989 | Conway | 363/143 |
| 4,922,258 | 5/1990 | Hassenpflug | 342/462 |
| 4,937,731 | 6/1990 | Konopka | 363/143 |
| 4,947,313 | 8/1990 | Nakamura | 363/143 |
| 5,001,623 | 3/1991 | Magid | 363/143 |
| 5,065,321 | 11/1991 | Bezos et al. | 364/424.04 |
| 5,083,078 | 1/1992 | Kübler et al. | 323/268 |
| 5,086,396 | 2/1992 | Waruszewski, Jr. | 364/454 |
| 5,097,402 | 3/1992 | Kriz et al. | 363/61 |
| 5,103,388 | 4/1992 | Williams et al. | 363/69 |
| 5,119,283 | 6/1992 | Steigerwald et al. | 363/37 |
| 5,138,547 | 8/1992 | Swoboda | 363/143 |
| 5,160,933 | 11/1992 | Hager | 342/174 |
| 5,162,984 | 11/1992 | Castagnet et al. | 363/61 |
| 5,166,789 | 11/1992 | Myrick | 358/109 |
| 5,185,700 | 2/1993 | Bezos et al. | 364/424.04 |
| 5,200,887 | 4/1993 | Ioroi et al. | 363/143 |
| 5,218,547 | 6/1993 | Tebbs | 364/424.06 |
| 5,223,788 | 6/1993 | Andreano et al. | 324/158 R |
| 5,241,217 | 8/1993 | Severinsky | 307/75 |
| 5,245,220 | 9/1993 | Lee | 307/80 |
| 5,272,387 | 12/1993 | Fiorina et al. | 307/130 |
| 5,283,474 | 2/1994 | Oi et al. | 307/116 |
| 5,310,992 | 5/1994 | Karino et al. | 363/142 |
| 5,319,533 | 6/1994 | Reynolds et al. | 363/17 |
| 5,345,376 | 9/1994 | Nourbakhsh | 363/62 |
| 5,375,052 | 12/1994 | Heavey et al. | 363/71 |

*Primary Examiner*—Matthew V. Nguyen
*Attorney, Agent, or Firm*—Oliff & Berridge

[57] ABSTRACT

An autoselecting interface for selectively connecting an input aircraft power source to one of two outputs according to a sensed voltage of the input aircraft power source comprises a pair of input terminals for connection to aircraft power sources; first and second pairs of output terminals; a first voltage sensor connected to the input terminals for producing a first trigger output when an AC aircraft voltage is present at the input terminals; a second voltage sensor connected to the input terminals for producing a second trigger output when a DC aircraft voltage is present at the input terminals; a first switch responsive to the first trigger output for electrically connecting the pair of input terminals to the first pair of output terminals; a second switch responsive to the second trigger output for electrically connecting the pair of input terminals to the second pair of output terminals; and an override circuit for disabling the second voltage sensor from producing the second trigger output when an AC aircraft voltage is present at the input terminals.

10 Claims, 3 Drawing Sheets

VOLTAGE SENSING, AUTOSELECTING AIRCRAFT POWER SUPPLY INTERFACE

BACKGROUND OF THE INVENTION

1. Field of the Invention

This invention relates in general to interfaces for connecting AC and DC power sources to power supplies, and more particularly to voltage sensing, autoselecting power supply interfaces for use with on-board aircraft power sources and AC/DC and DC/DC power supplies for portable test equipment.

2. Description of Related Art

Nonstandardization on American and international fleets of trans-Atlantic aircraft of electrical power outlets used to provide auxiliary power presents a problem for portable test equipment that needs to utilize such onboard power. For example, the identical physical outlet is used to provide 28 VDC on a U.S. 747 model aircraft, and to provide 115 VAC at 400 Hz on a British Airways Model DC-10. This nonstandardization problem also exists with dissimilar U.S. model planes, e.g., a 757 versus a DC-10. This problem occurs time and time again when different model aircraft are compared.

Attempts to alleviate this problem, for example, by using cables labelled with specific voltages, still result in catastrophic equipment failures when, through user error, cables meant to connect a 28 VDC voltage using standard U.S. residential plugs are plugged into 115 VAC wall outlets.

It is known generally in the power supply art to provide power supplies that produce regulated outputs in response to a variety of input voltages and frequencies. See, e.g., U.S. Pat. Nos. 5,319,533 to Reynolds et al., 5,001,623 to Magid, 4,890,217 to Conway and 3,772,583 to Sahara et al. However, none of these power supplies permit AC and DC power sources to be connected to a common input. Further, these multi-voltage power supplies are relatively complex, and include no fail safe provision to prevent the wrong power source from being connected to the input terminals.

SUMMARY OF THE INVENTION

These and other disadvantages of the prior art are overcome by a voltage sensing, autoselecting aircraft power supply interface in accordance with the present invention, which comprises a pair of input terminals for connection to aircraft power sources; first and second pairs of output terminals; and first and second voltage sensors connected to the input terminals. The first voltage sensor produces a first trigger output when an AC voltage is present at the input terminals, and the second voltage sensor produces a second trigger output when a DC voltage is present at the input terminals.

An interface according to the invention further comprises a first switch responsive to the first trigger output for electrically connecting the pair of input terminals to the first pair of output terminals; and a second switch responsive to the second trigger output for electrically connecting a pair of input terminals to the second pair of output terminals. In addition, an override circuit is provided for disabling the second voltage sensor from producing the second trigger output when an AC voltage is present at the input terminals.

In accordance with a further aspect of the invention, the second trigger output is time delayed following the sensing of a DC voltage by the second voltage sensor; and the override circuit is responsive to the first trigger output.

In accordance with a still further aspect of the present invention, the autoselecting interface is incorporated in an autoselecting power supply that includes an AC-DC power converter for producing a first regulated DC voltage output from an AC power source connected to the pair of input terminals and a DC-DC power converter for producing a second regulated DC voltage output from a DC power source connected to the pair of input terminals. The first interface switch electrically connects the pair of input terminals to the AC-DC power converter responsive to the first trigger output; and the second switch electrically connects the pair of input terminals to the DC-DC power converter responsive to the second trigger output.

These and other features and advantages of the present invention will be described in, or apparent from, the following detailed description of preferred embodiments.

BRIEF DESCRIPTION OF THE DRAWINGS

The preferred embodiments will be described with reference to the drawings, wherein.

DETAILED DESCRIPTION OF THE PREFERRED EMBODIMENTS

Figure 1:
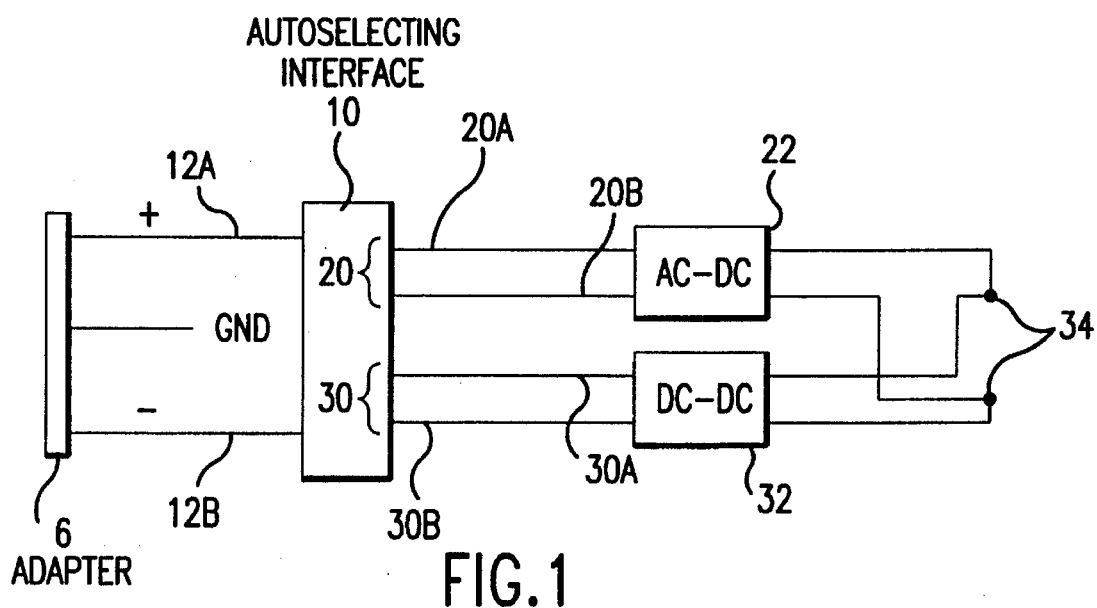
FIG. 1 is an overall block diagram of an autoselecting power supply for producing a regulated DC voltage output from an input AC or DC aircraft power source that incorporates an autoselecting interface according to the present invention.

Referring to FIG. 1, an autoselecting power supply for producing a regulated DC voltage output from an input AC or DC aircraft power source comprises an autoselecting interface 10 having a pair 12 of input terminals 12A and 12B for connection to aircraft power sources. Interface 10 also includes a first pair 20 of output terminals 20A and 20B connected to an AC-DC power converter 22, and a second pair 30 of output terminals 30A and 30B connected to a DC-DC power converter 32. The outputs of the converters 22 and 32 are connected to a pair of output terminals 34 for connection to test equipment or the like. In order to be compatible with different configurations of plugs provided by standard aircraft AC and DC power source cables, at least one adaptor 6 is provided for electrically connecting such different plugs to input terminals 12A and 12B. An AC-DC power converter 22 that is suitable for use with typical aircraft AC power sources, which provide voltages in the range of 115–230 VAC, and in a frequency range between 50 and 400 Hz, is a SOLA Model GLS-12-036 switching power supply. This power supply transforms input AC voltages into a 12 VDC regulated output signal that is suitable for typical portable test equipment used on-board aircraft. One example of such test equipment is the GPS-based altimeter calibration unit disclosed in copending application Ser. No. 08/334, 087, which is assigned to the assignee of the present invention and incorporated herein by reference. A DC-DC power converter 32 that is suitable for use with typical aircraft DC power sources, which normally are in the range of 18–40 VDC, is an Intel LM338K voltage regulator. This voltage regulator likewise provides a regulated 12 VDC voltage output that is suitable for portable test equipment such as the aforementioned GPS-based altimeter calibration unit.

Figure 2:
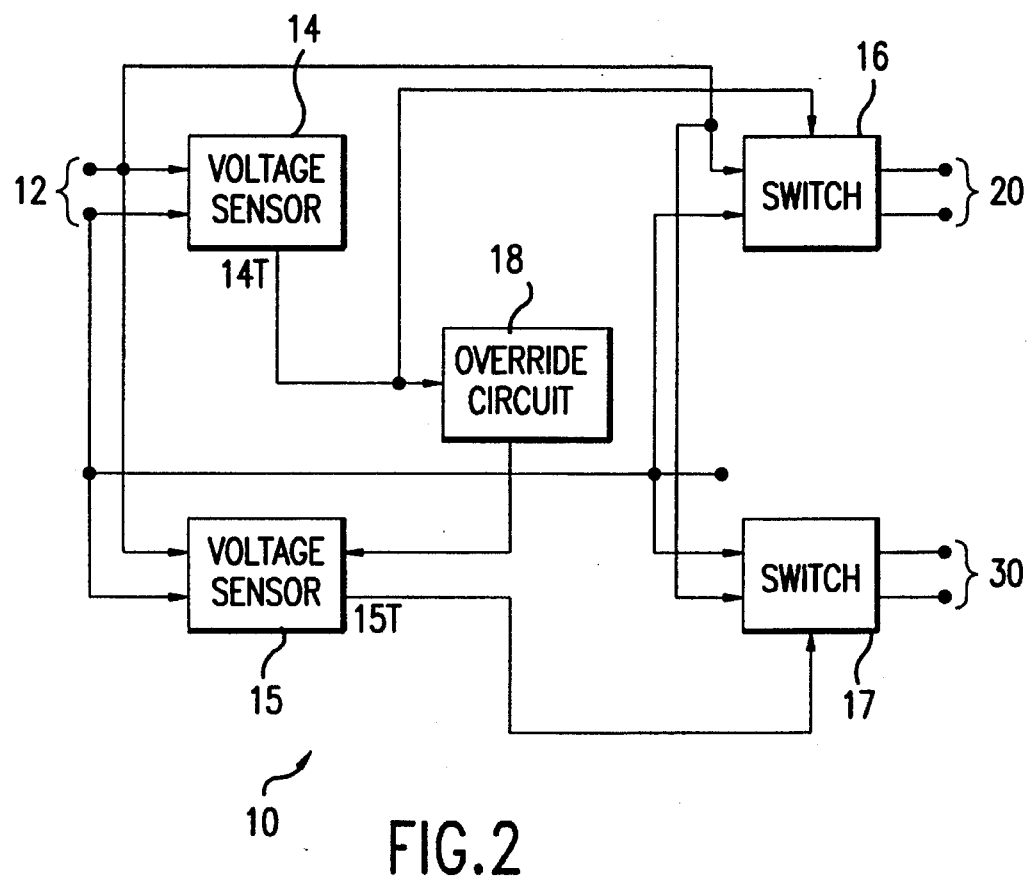
FIG. 2 is an electrical block diagram illustrating the principal components of the autoselecting interface shown in FIG. 1.

Referring now to FIG. 2, autoselecting interface 10 further comprises first and second voltage sensors 14, 15 respectively connected to the interface input terminals 12A and 12B, and first and second switches 16, 17 for electrically connecting the interface input terminals 12A and 12B to the first and second pairs of output terminals 20A, 20B and 30A, 30B, respectively. Voltage sensor 14 produces a first trigger output 14T when an AC voltage is present at the interface input terminals 12A, 12B; and voltage sensor 15 produces a second trigger output 15T when a DC voltage is present at the interface input terminals. First switch 16 is responsive to the first trigger output 14T, and second switch 17 is responsive to the second trigger output 15T. Autoselecting interface 10 further comprises an override circuit 18 that is responsive to the first trigger output 14T for disabling voltage sensor 15 from producing trigger output 15T.

Figure 3:
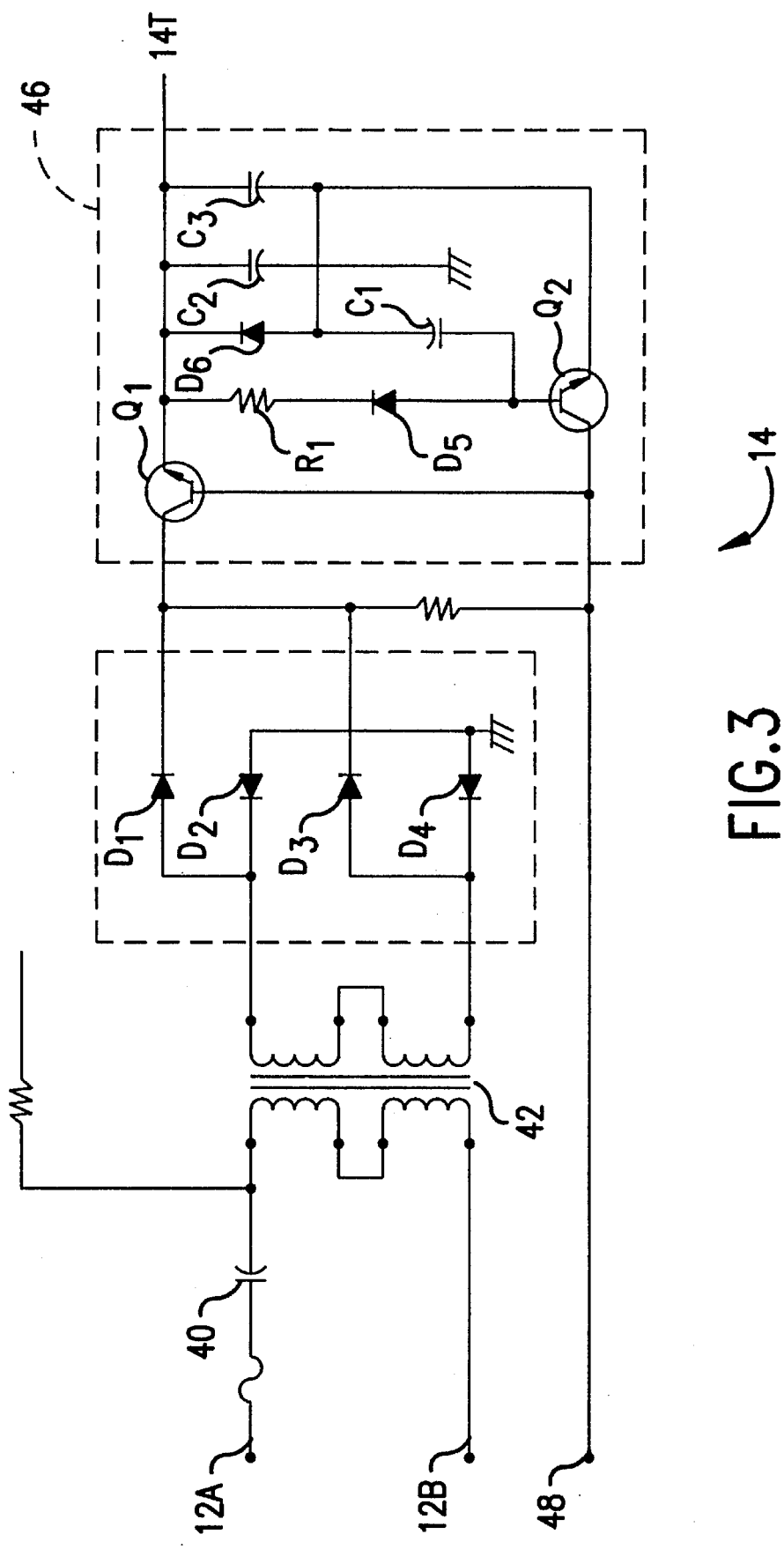
FIG. 3 is an electrical circuit schematic diagram of an AC voltage sensor forming part of the autoselecting interface illustrated in FIG. 2.
Figure 4:
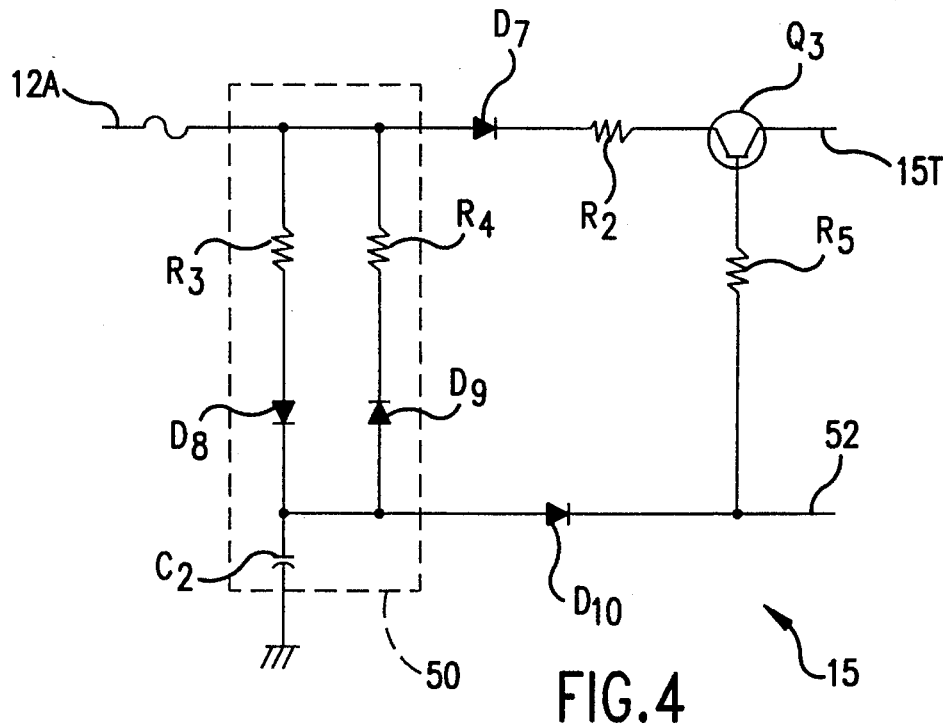
FIG. 4 is an electrical schematic circuit diagram of a DC voltage sensor forming part of the autoselecting interface shown in FIG. 2.
Figure 5:
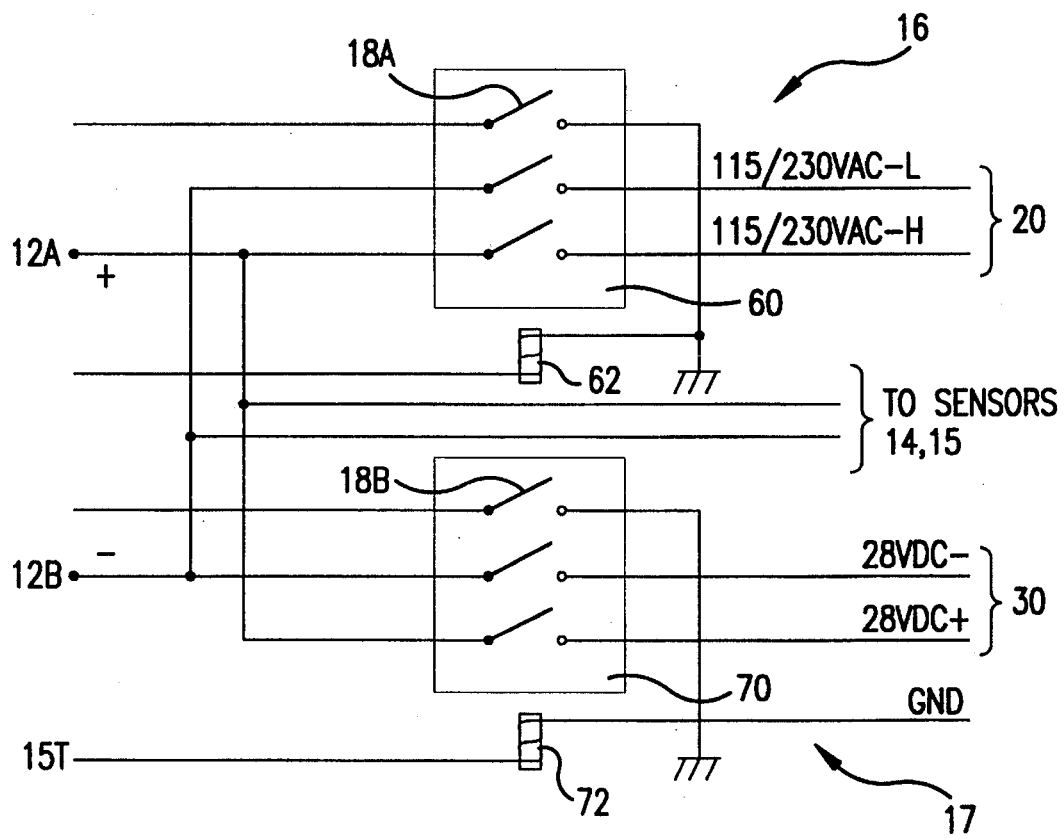
FIG. 5 is an electrical circuit schematic diagram of a switch portion of the autoselecting interface shown in FIG. 2.

Referring now to FIGS. 3–5, preferred embodiments of voltage sensors 14 and 15, switches 16 and 17 and override circuit 18 will now be described. As shown in FIG. 3, voltage sensor 14 comprises a blocking capacitor 40, a step-down transformer 42, a rectifier circuit 44, and a voltage regulator circuit 46.

Capacitor 40 prevents DC voltages, and AC voltages below a predetermined frequency, from being sensed and causing a trigger signal 14T to be generated erroneously. The cut-off frequency of capacitor 40 is selected to block ripple voltages and the like that can be associated with the outputs of DC power sources, as well as pure DC voltages, from being input to the rest of voltage sensor 14.

Transformer 42 converts an inputted AC voltage to a predetermined lower AC voltage. Rectifier circuit 44 advantageously comprises four diodes D1–D4 connected in a full-wave bridge configuration as shown to produce a predetermined DC voltage. Regulator 46 comprises transistors Q1 and Q2, diodes D5 and D6, resistor R1 and capacitors C1–C3 connected as shown to produce a constant DC voltage, despite variations in the rectified DC voltage produced by rectifier circuit 44. Transformer 42, rectifier circuit 44 and regulator circuit 46 of voltage sensor 14 thus convert an AC input voltage to a regulated DC output of predetermined voltage, e.g., 12 VDC, for use as trigger output 14T.

As shown in FIG. 4, sensor 15 comprises a transistor switch circuit that includes a normally-off transistor Q3 having its collector connected to one of the interface input terminals, 12A via a diode D7 and resistor R2, and its emitter connected to the sensor output. The base of transistor Q3 is also connected to the interface input terminal 12A via a tank circuit 50, diode D10 and resistor R5. Tank circuit 50 comprises resistors R3 and R4, diodes D8 and D9, and capacitor C2 connected as shown so that the voltage applied to the base of transistor Q3 reaches a predetermined level sufficient to turn transistor Q3 on after a predetermined time delay defined by the RC time constant of tank circuit 50. Sensor 15 also has a control input 52 connected to the junction between resistor R5 and diode D10, as shown. Control input 52 is connected to override circuit 18. In the preferred embodiment of override circuit 18 described below, override circuit 18 is activated by trigger output 14T to connect control input 52 to ground, and thereby prevent transistor Q3 from being switched on.

It will be appreciated that the illustrated embodiments of sensors 14 and 15 are particularly adapted for use with the relay switch embodiment of switch 16 described below, and that the invention is not limited with respect to the form of sensor 14 or the trigger output produced thereby.

As shown in FIG. 5, switches 16 and 17 are each normally-open relay switches having two pairs of contacts 60, 70 that are closed when a solenoid 62, 72, respectively, is energized. The pairs of contacts 60 are connected between interface input terminals 12A, 12B and interface output terminals 20A, 20B. The pair of contacts 70 are connected between interface input terminals 12A, 12B and interface output terminals 30A, 30B. One terminal of solenoid 62 is connected to trigger output 14T, while the other terminal is connected to ground. Similarly, one terminal of solenoid 72 is connected to trigger output 15T, while the other terminal is connected to ground.

Override circuit 18 advantageously comprises a normally open relay switch 18A having one contact connected to ground and the other contact connected to control input 52 of sensor 15. As shown in FIG. 5, relay switch 18A advantageously is part of switch 16, so that the same solenoid 62 that closes switch contacts 60 also closes switch 18A when trigger output 14T is generated. Override circuit 18 optionally further comprises another normally-open relay switch 18B that is responsive to trigger output 15T and has one contact connected to ground and the other contact connected to a control input 48 of voltage sensor 14 that disables sensor 14 from producing trigger output 14T when sensor 15 generates trigger output 15T. As shown in FIG. 3, control input 48 is advantageously connected to the base of transistor Q1. As shown in FIG. 5, relay switch 18B advantageously is part of switch 17, so that the same solenoid 72 that closes switch contacts 70 also closes switch 18B when trigger output 15T is generated. It will be appreciated that switch 18B is not necessary, since blocking capacitor 40 of sensor 14 prevents trigger output 14T from being generated when a DC power source is connected to interface input terminals 12A, 12B.

It will be appreciated by those skilled in the art that the autoselecting interface of the invention provides a simple, failsafe interface that permits different AC and DC aircraft power sources to be reliably and automatically connected to an appropriate power converter or power supply without regard to the type of connecting cable that is used with the power source, and without the need for the user to confirm the type of power source. It will also be appreciated that the invention has been described with reference to exemplary preferred embodiments, and that modifications and alterations can be made without departing from the invention.

What is claimed is:

1. An autoselecting interface for selectively connecting an input aircraft power source to one of two interface outputs according to a sensed voltage of the input aircraft power source, the interface comprising:

a pair of input terminals for connection to aircraft power sources;

first and second pairs of output terminals;

first and second voltage sensors connected to said input terminals, said first voltage sensor producing a first trigger output when an AC voltage is present at said input terminals and said second voltage sensor producing a second trigger output when a DC voltage is present at said input terminals;

a first switch responsive to said first trigger output for electrically connecting said pair of input terminals to said first pair of output terminals;

a second switch responsive to said second trigger output for electrically connecting said pair of input terminals to said second pair of output terminals; and an override circuit for disabling said second voltage sensor from producing said second trigger output when an AC voltage is present at said input terminals.

2. The autoselecting interface of claim 1 wherein said second trigger output is time delayed following sensing of a DC voltage by said second voltage sensor; and said override circuit is responsive to said first trigger output.

3. The autoselecting interface of claim 2 wherein:

said second voltage sensor comprises a normally-off transistor switch responsive to a predetermined input voltage, and an input circuit responsive to a DC voltage present at said pair of input terminals for producing said predetermined input voltage after a predetermined time delay; and said override circuit comprises a switch responsive to said first trigger output for grounding said second voltage sensor input circuit so that said predetermined input voltage is not produced.

4. The autoselecting interface of claim 1 wherein said first voltage sensor comprises an AC-DC converter for producing a regulated DC trigger output from an AC voltage present at said pair of input terminals.

5. The autoselecting interface of claim 4 wherein said first voltage sensor comprises an input capacitor for blocking input voltages below a predetermined frequency.

6. The autoselecting interface of claim 4 wherein said first and second switches are solenoid-actuated relay switches.

7. The autoselecting interface of claim 6 wherein said override circuit comprises a relay switch actuated by a solenoid of said first switch and connected to a control input of said second voltage sensor.

8. The autoselecting interface of claim 7 wherein:

said second voltage sensor comprises a normally-off transistor switch responsive to a predetermined input voltage, and an input circuit responsive to a DC voltage present at said pair of input terminals for producing said predetermined input voltage after a predetermined time delay, and said control input is connected to the output of said input circuit; and said override circuit relay switch connects said control input to ground when said first switch solenoid is energized by said first trigger output.

9. The autoselecting interface of claim 1 further comprising at least one adaptor for connecting standard AC and DC aircraft power source connecting cables to said pair of input terminals.

10. An autoselecting power supply for producing a regulated DC voltage output from an input AC or DC aircraft power source, the power supply comprising:

a pair of input terminals for connection to the aircraft power sources;

an AC-DC power converter for producing a first regulated DC voltage output from an AC aircraft power source connected to said pair of input terminals;

a DC-DC power converter for producing a second regulated DC voltage output from a DC aircraft power source connected to said pair of input terminals;

first and second voltage sensors connected to said input terminals, said first voltage sensor producing a first trigger output when an AC voltage is present at said input terminals and said second voltage sensor producing a second trigger output when a DC voltage is present at said input terminals;

a first switch responsive to said first trigger output for electrically connecting said pair of input terminals to said AC-DC power converter;

a second switch responsive to said second trigger output for electrically connecting said pair of input terminals to said DC-DC power converter; and an override circuit for disabling said second voltage sensor from producing said second output when an AC voltage is present at said input terminals.

* * * * *